United States Patent [19]

Foster

[11] Patent Number: 4,738,425
[45] Date of Patent: Apr. 19, 1988

[54] COMPUTER PRINTER SUPPORT

[76] Inventor: Michael S. Foster, 914 Lazywood La., Shreveport, La. 71108

[21] Appl. No.: 11,041

[22] Filed: Feb. 5, 1987

[51] Int. Cl.⁴ ............................................. A47G 29/00
[52] U.S. Cl. .................... 248/346; 248/176; 248/678; 248/346.1
[58] Field of Search ..................... 248/346, 346.1, 678, 248/176; 400/694, 691; 312/208

[56] References Cited

U.S. PATENT DOCUMENTS

| 1,903,690 | 4/1933 | Schacht | 248/346.1 |
| 2,915,850 | 12/1959 | Goodfellow | 248/346.1 |
| 3,713,620 | 1/1973 | Tkach | 248/346 X |
| 4,382,733 | 5/1983 | Rodgers | 248/346 X |
| 4,563,102 | 1/1986 | Sanders et al. | 400/691 |

Primary Examiner—Ramon O. Ramirez
Attorney, Agent, or Firm—John M. Harrison

[57] ABSTRACT

A computer printer support for elevating a computer printer, which support includes a generally "H"-shaped frame characterized by a pair of parallel support legs provided with four spaced recesses and a pair of spaced, parallel connecting braces for maintaining the support legs in parallel configuration. The computer printer support is designed to rest horizontally on a supporting surface to elevate the printer and facilitate location of a draft box containing printer paper and a dolly supporting the draft box into the printer compartment.

14 Claims, 1 Drawing Sheet

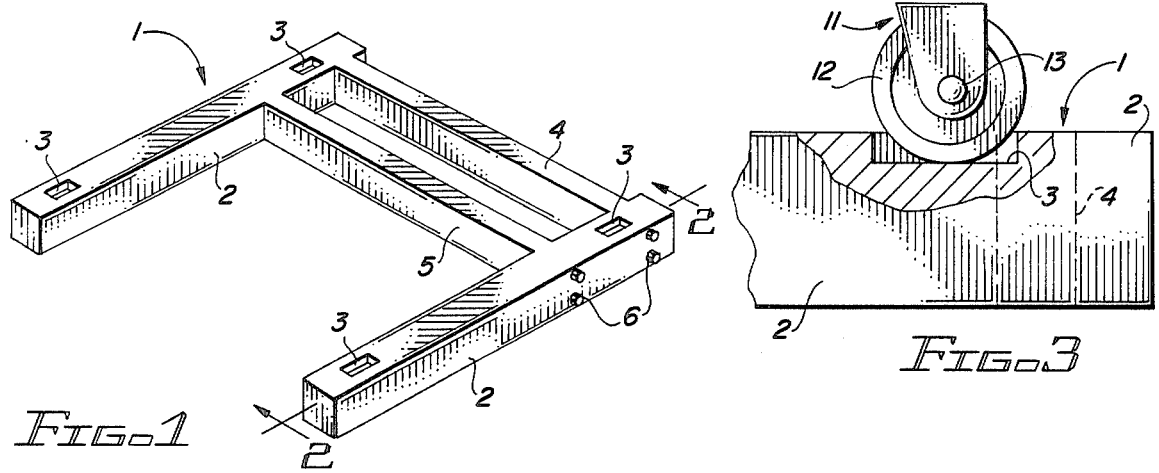
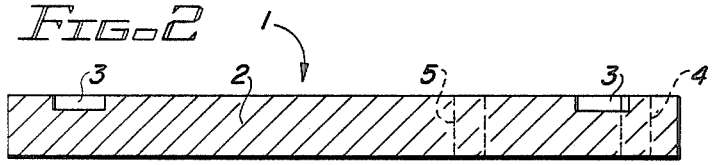
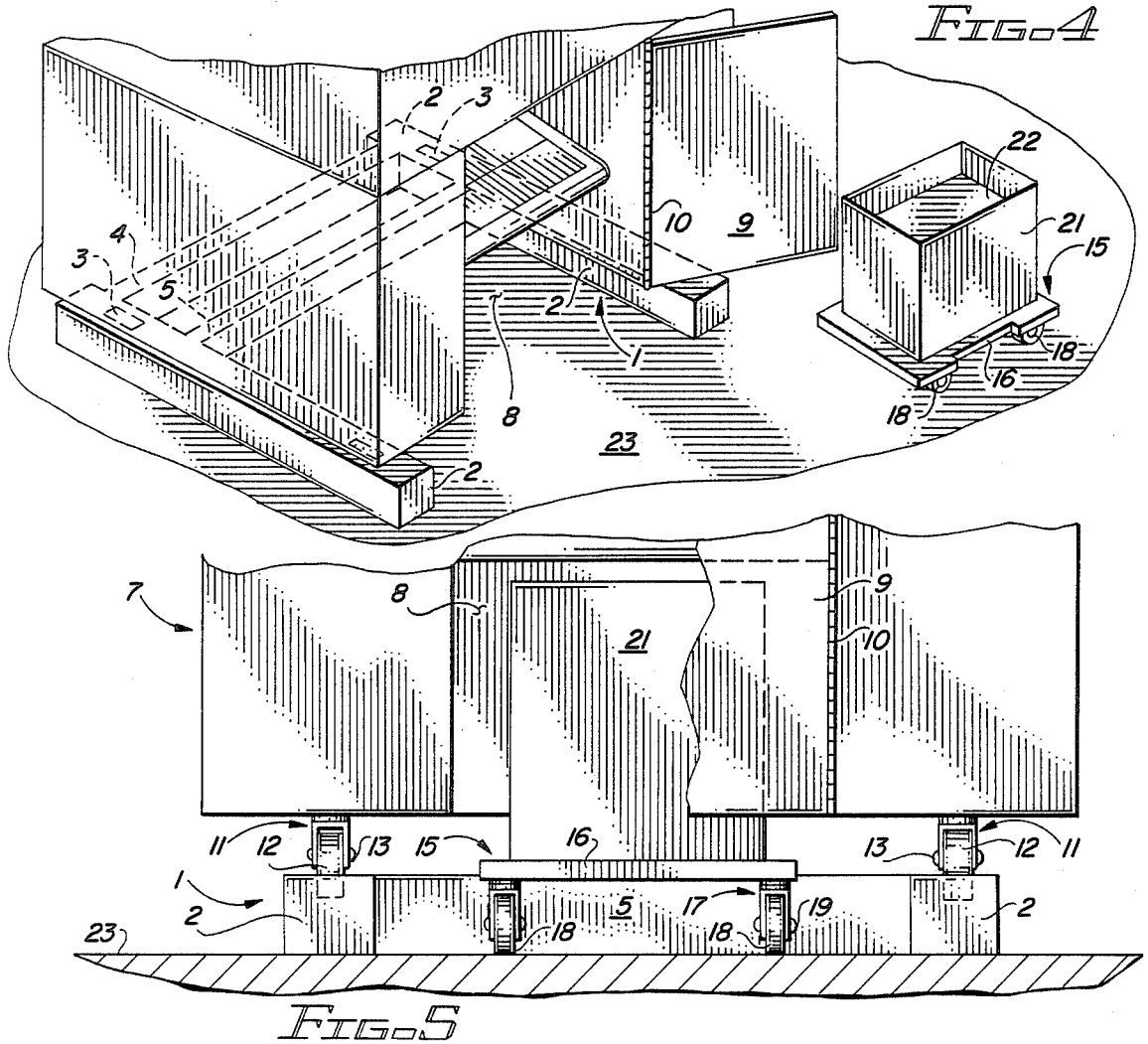

COMPUTER PRINTER SUPPORT

BACKGROUND OF THE INVENTION

1. Field of the Invention

This invention relates to computer printing equipment and more particularly, to a computer printer support for elevating an IBM Model 5262 printer, in order to facilitate location of a draft box containing printer paper and a dolly supporting the draft box inside the paper feed compartment beneath the printer to feed the printer paper to the printer.

Computer paper and forms are usually packaged in boxes known as draft boxes, which are about twelve inches tall. These draft boxes are designed to fit inside the paper feed, or printer compartment of a printer, which is about fifteen inches high. When the draft boxes are placed on a standard four-inch dolly for ease of transportation, the total height of the dolly and the draft box is approximately 16 inches. Accordingly, the dolly and draft box combination cannot be rolled into the printer compartment when the printer is resting on the floor or supporting surface in an office. A solution to the problem is to lift or push the draft box off the dolly and subsequently lift or slide the draft box into the printer compartment of the computer printer without the dolly. Since these boxes are heavy, stooping to lift or drag them from a storage area to the printer and back, can result in injury to the printer operator. Computer printers such as the IBM Model 5262 are fitted with casters for easy mobility, but the casters are not sufficiently large to elevate the printer to a point where a draft box carrying printer paper will fit inside the printer compartment on a dolly.

2. Description of the Prior Art

Computer printers such as the IBM Model 5262 are normally equipped with casters and rollers, but are not designed to receive draft boxes placed on rolling dollys and containing printer paper for location in the printer compartment and feeding the printer. Accordingly, it is an object of this invention to provide a new and improved computer printer support or platform which is designed to elevate a computer printer and facilitate insertion of a draft box and dolly combination into the printer compartment, in order to feed printer paper to the printer.

Another object of this invention is to provide a new and improved, elevated computer printer platform or support which is constructed of parallel support beams connected near one end by braces, for supporting the computer printer and facilitating the insertion of both a draft box containing printer paper and a rolling dolly carrying the draft box into the printer compartment of a computer printer.

Yet another object of this invention is to provide a new and improved computer printer support for elevating an IBM Model 5262 computer printer, which printer support is characterized by a pair of spaced wooden timbers or supports connected near one end by parallel braces and provided with spaced slots or recesses for receiving the caster rollers mounted on the printer, in order to elevate the printer and facilitate access to the printer compartment by a draft box mounted on a dolly and containing printer paper.

A still further object of this invention is to provide a computer printer support for elevating a computer printer to a selected height over a supporting surface, which computer printer support includes a pair of slotted, parallel wooden legs spaced by a pair of parallel braces which are nailed, bolted or screwed to the legs near one end of the legs, in order to accommodate a draft box and supporting dolly in the printer compartment of a computer printer resting on the computer printer support.

SUMMARY OF THE INVENTION

These and other objects of the invention are provided in a new and improved computer printer support which is characterized by a pair of spaced support members or legs, each having a square cross-section in a preferred design, and connected by a pair of parallel braces near one end of the support legs, which support members further include slots or recesses for receiving the rollers mounted on a computer printer, in order to facilitate locating printer paper in draft boxes placed on dollys in the elevated printer compartment of the computer printer.

BRIEF DESCRIPTION OF THE DRAWING

The invention will be better understood by reference to the accompanying drawing, wherein:

FIG. 1 is a perspective view of a preferred embodiment of the computer printer support of this invention;

FIG. 2 is a sectional view of the computer printer support, taken along line 2—2 in FIG. 1;

FIG. 3 is a sectional view of one end of one of the support legs of the computer printer support illustrated in FIGS. 1 and 2;

FIG. 4 is a perspective view of the computer printer support illustrated in FIG. 1, located in functional position supporting a computer printer; and FIG. 5 is a front elevation, partially in section, of the computer printer supported by the computer printer support illustrated in FIG. 4, more particularly illustrating the positioning of a dolly and draft box containing printer paper inside the printer compartment of the elevated computer printer.

DESCRIPTION OF THE PREFERRED EMBODIMENTS

Referring initially to FIGS. 1 and 2 of the drawing, the computer printer support of this invention is generally illustrated by reference numeral 1. The computer printer support 1 is characterized by a pair of spaced support legs 2, which are maintained in substantially parallel relationship by the spaced and parallel outside brace 4 and inside brace 5. Each of the support legs 2 are fitted with spaced wheel slots or recesses 3, for a purpose which will be hereinafter further described. In a most preferred embodiment of the invention the support legs 2 are each characterized by a cedar block of selected length, having a square cross-section and are connected to the wooden outside brace 4 and inside brace 5 by means of lag screws 6. However, it will be appreciated by those skilled in the art that other materials of construction, including fiberglass, metal and appropriate elastomers and well known moldable plastic materials such as polyethylene and polypropylene, in non-exclusive particular, can be used to fabricate the support legs 2, outside brace 4 and inside brace 5 of the computer printer support 1, according to the knowledge of those skilled in the art.

Referring now to FIGS. 3, 4 and 5 of the drawing, the computer printer support 1 is designed to elevate a computer printer 7 above a supporting surface 23, which computer printer 7 is provided with a printer compartment 8 that is closed by a door 9, mounted on a panel hinge 10. The computer printer 7 is fitted with four printer casters 11, which include printer rollers 12 that are rotatably mounted on separate printer roller pins 13, as illustrated in FIG. 3 of the drawings. As further illustrated in FIG. 3, each of the printer rollers 12 is recessed in a companion wheel recess 3, provided in spaced relationship in the support legs 2 of the computer printer support 1, in order to maintain the computer printer 7 in stable, elevated configuration, as illustrated in FIGS. 4 and 5. As further illustrated in FIGS. 4 and 5, a paper dolly 15, having a dolly base 16 and fitted with dolly casters 17 and cooperating dolly rollers 18, rotating on dolly roller pins 19, is designed to transport a draft box 21, containing printer paper 22 from a storage area (not illustrated) to the printer compartment 8. As illustrated in FIG. 5, the paper dolly 15 and draft box 21 are positioned inside the printer compartment 8, where the dolly rollers 18 rest on the supporting surface 23 and printer paper 22 can then be fed to a printer (not illustrated). Access of the paper dolly 15 and draft box 21 into the printer compartment 8 is facilitated by the open design of the computer printer support 1, wherein the paper dolly 15 and draft box 21 fit between the support legs 2 rearwardly of the offset outside brace 4 and inside brace 5.

It will be appreciated by those skilled in the art that in addition to the expedient of elevating the computer printer 7 above the supporting surface 23 in order to facilitate access of the paper dolly 15 and the draft box 21 into the printer compartment 8, the computer printer support 1 also serves to reduce vibration and the noise level of the computer printer 7 during operation. In this regard, and as above noted, in another preferred embodiment of the invention at least the support legs 2 of the computer printer support 1 are constructed of sound-deadening wood and most preferably, lengths of cedar having a cross-section of four inches square, in order to reduce vibration and to promote ease of construction. In a most preferred embodiment of the invention, both of the support legs 2, as well as the outside brace 4 and the inside brace 5 are constructed of cedar and both the outside brace 4 and inside brace 5 are constructed of 2"×4" lumber. While the 4"×4" inch square configuration is preferred for the support legs 2, it will be appreciated that other dimensions, such as 2"×4", 6"×6", 1"×2" and the like, in non-exclusive particular, can also be used in the construction of the support legs 2, as well as the outside brace 4 and inside brace 5, according to the desires of those skilled in the art. It will be further appreciated that the dimension between the supporting surface 23 and the printer rollers 12 of the computer printer 7 is the critical dimension and the support legs 2 must be designed with that dimension in mind, in order to fully and efficiently accommodate both the draft box 21 and paper dolly 15 in the printer compartment 8 of the computer printer 7. In another most preferred embodiment of the invention, under circumstances where the computer printer support 1 is designed to support and elevate an IBM Model 5262 computer printer, the respective dimensions of the support legs 2, wheel recesses 3, outside brace 4 and inside brace 5, are as follows: length of the support legs 2: 29 inches; cross-sectional dimension of the support legs 2: 4 inches×4 inches; length of the wheel recesses 3: 2.5 inches; width of the wheel recesses 3: 1.75 inches; spacing of the wheel recesses 3: 19 inches; length of the outside brace 4 and inside brace 5: 25.25 inches; cross-sectional dimension of the outside brace 4 and inside brace 5: 2 inches×4 inches; spacing of the outside brace 4 and inside brace 5: 6 inches; and spacing of the outside brace 4 from one end of the support legs 2: 1.25 inches.

Referring again to FIG. 1 of the drawing, in yet another preferred embodiment of the invention where the computer printer support 1 is constructed of wood, four holes are drilled in each of the support legs 2 at the points where the outside brace 4 and inside brace 5 are attached, in order to accommodate the lag screws 6. In a most preferred embodiment the holes are about 5/16 of an inch in diameter to receive ¼ inch×6 inch lag screws and registering holes are also drilled into the ends of the outside brace 4 and inside brace 5, to minimize splitting, according to the knowledge of those skilled in the art.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A computer printer support for elevating and supporting a printer, said computer printer support comprising a pair of support legs disposed in substantially parallel, horizontal relationship for receiving and supporting the printer, a pair of braces connecting said support legs in substantially parallel, spaced relationship near one end of said support legs, said support legs and said braces oriented in a common plane and recesses provided in spaced relationship in the top surfaces of said support legs.

2. A computer printer support for elevating and supporting a printer provided with printer casters, said computer support comprising a pair of elongated support legs disposed in substantially parallel, horizontal relationship on a supporting surface for receiving the printer casters and supporting the printer above the supporting surface and brace means connecting said support legs for maintaining said support legs in said substantially parallel, horizontal relationship, said support legs and said brace means disposed in substantially the same plane.

3. The computer printer support of claim 2 wherein said brace means further comprises at least one brace extending between said support legs.

4. The computer printer support of claim 3 wherein said at least one brace is a pair of braces disposed in substantially parallel relationship between said support legs.

5. The computer printer support of claim 4 wherein said braces join said support legs at spaced points near one end of said support legs.

6. The computer printer support of claim 2 further comprising recesses provided in spaced relationship in the top surfaces of said support legs, said recesses substantially corresponding to the spacing of the casters on the printer for receiving the casters and supporting the printer on said support legs.

7. The computer printer support of claim 2 wherein said brace means further comprises at least one brace extending between said support legs and further comprising recesses provided in spaced relationship in the top surfaces of said support legs, said recesses substantially corresponding to the spacing of the casters on the printer for receiving the casters and supporting the printer on said support legs.

8. The computer printer support of claim 7 wherein said at least one brace is a pair of braces disposed in substantially parallel relationship between said support legs.

9. The computer printer support of claim 8 wherein said braces join said support legs at spaced points near one end of said support legs.

10. The computer printer support of claim 9 wherein said support legs and said braces are constructed of wood and further comprising fastening means extending through said support legs and into said braces for securing said braces to said support legs.

11. The computer printer support of claim 10 wherein said fastening means is a plurality of lag screws.

12. A computer printer support for elevating and supporting a computer printer having rotatable casters above a supporting surface, said computer printer comprising a pair of elongated support legs disposed in substantially parallel, horizontal relationship on the supporting surface; a pair of spaced recesses provided in the top surface of each of said support legs near the ends thereof for receiving the casters and stabilizing the computer printer on said support legs; and brace means connecting said support legs for maintaining said support legs in said substantially parallel relationship, said support legs and said brace means disposed in substantially the same plane.

13. The computer printer support of claim 12 wherein said brace means is a pair of braces disposed in substantially parallel relationship between said support legs near one end of said support legs.

14. The computer printer support of claim 13 wherein said support legs and said braces are constructed of wood and further comprising fastening means extending through said support legs and into said braces for securing said braces to said support legs.

* * * * *